United States Patent [19]

Krumrein

[11] Patent Number: 4,504,820
[45] Date of Patent: Mar. 12, 1985

[54] FLASHER UNIT

[75] Inventor: Gerhard Krumrein, Neuenstadt, Fed. Rep. of Germany

[73] Assignee: Telefunken Electronic GmbH, Heilbronn, Fed. Rep. of Germany

[21] Appl. No.: 373,035

[22] Filed: Apr. 28, 1982

[30] Foreign Application Priority Data

May 8, 1981 [DE] Fed. Rep. of Germany ....... 3118240

[51] Int. Cl.³ .......................... B60Q 1/38; G08B 5/38
[52] U.S. Cl. .................................. 340/81 R; 340/73; 340/642; 315/200 A
[58] Field of Search ............. 340/81 R, 73, 642, 81 F, 340/641, 643, 661–664, 331, 645; 307/10 LS; 315/200 A, 82, 77, 83, 88, 93

[56] References Cited

U.S. PATENT DOCUMENTS

| 3,643,246 | 2/1972 | Gerlach et al. ...................... 340/52 |
| 4,150,359 | 4/1979 | Mizuno et al. ..................... 340/81 R |
| 4,160,235 | 7/1979 | Krumrein .......................... 340/81 R |
| 4,207,553 | 6/1980 | Mizuno et al. ..................... 340/81 R |
| 4,389,597 | 6/1983 | Krumrein .......................... 340/81 R |

FOREIGN PATENT DOCUMENTS

| 1931235 | 1/1971 | Fed. Rep. of Germany . |
| 1921034 | 4/1971 | Fed. Rep. of Germany . |
| 2503009 | 6/1977 | Fed. Rep. of Germany . |
| 2647569 | 4/1978 | Fed. Rep. of Germany . |
| 2705499 | 8/1978 | Fed. Rep. of Germany . |
| 2913826 | 10/1980 | Fed. Rep. of Germany . |
| 3014417 | 10/1980 | Fed. Rep. of Germany . |

Primary Examiner—Donnie L. Crosland
Attorney, Agent, or Firm—Spencer & Frank

[57] ABSTRACT

A flasher unit is provided with a comparator whose output signal is fed to a pulse generator for producing the flash frequency signal, the comparator being supplied with a reference voltage at one input and a voltage dependent on the current passing through the flasher lamps at the other input and with a switch element which changes the reference voltage in accordance with the comparator output signal such that the comparator produces an output signal for the whole of the light up time of the lamps.

12 Claims, 12 Drawing Figures

FLASHER UNIT

BACKGROUND OF THE INVENTION

The invention relates to a flasher unit having a comparator, the output signal of which feeds a pulse generator in order to produce the flash frequency signal and a reference voltage is supplied to one input and a voltage, which depends on the current through the flasher lamps, is supplied to the other input.

As is known a failure check has to be carried out for flasher units for use in motorised vehicles. In the known unit, the flasher lamps together with a precision resistor are connected between the positive pole and the negative pole of a battery. The path comprising the precision resistor and the flasher lamps can be switched and in fact the switch is switched by frequency switching in rhythm with the flash frequency by means of a pulse generator.

The voltage drop which takes place across the precision resistor, which is proportional to the current through the flash lamps is evaluated and supplied to the pulse generator. The pulse generator is switched in frequency by the voltage across precision resistor. In order to be able to detect whether all of the flasher lamps which have to light up on actuation of the flash switch are flashing and therefore whether the flash unit is operating (correctly), there must be a clear jump in flash frequency. This means that when operating the flash unit flash lamps have to flash at a substantially lower frequency than is the case when a lamp fails or the flash unit fails.

In a practical example of a flash unit with fault indication, besides the precision resistor a relay contact which can be switched in time with the flash frequency, and the flasher lamps, there is a voltage divider which comprises two resistors and is connected in parallel with the voltage source. A comparator is provided, a reference voltage $U_{ref}$ being supplied to one input. This reference voltage is tapped at the connecting point between resistors of the voltage divider. The voltage across precision resistor is supplied to the other input of the comparator. The voltage across the precision resistor, which is proportional to the current through the flasher lamps delivers the measured signal which is compared in the comparator with the reference voltage.

In operation the measured voltage (voltage drop across precision resistor) depends on the filament temperature of the flasher lamps. As is known, the current through an incandescent lamp is substantially greater at the moment when it switched on, than is the case during ordinary running. Therefore the voltage drop across precision resistor is also at its greatest at the moment of switching on. After switching on (the lamp), the voltage across precision resistor falls. The voltage drop across precision resistor at low frequency (flash unit OK-) is considerably larger than the voltage drop across precision resistor when there was a fairly high (doubled) frequency—(flash unit not OK-). When the relay contact is open, the i.e. when the lamp is not on, the voltage drop across precision resistor returns to zero.

The reference voltage is equal to the voltage drop across the first of the dividor resistors and remains almost constant both during the light up time and when the lamp is not lit, however, it remains within a certain tolerance range.

If a fixed reference voltage is used, then only very small tolerances are permitted for optimum operation of the pulse generator which is fed by the output signal of the comparator. The tolerance range available means that, depending on the circumstances, either a comparator signal is provided for control of the pulse generator or is not. However, perfect generation of the flash frequency presupposes that a comparator output signal has to be provided for the whole of the light up time (light up time equals the time in which the flasher lamps are illuminated).

The invention is based on the knowledge that a tolerance range for the comparator output signal cannot be avoided with a fixed reference voltage and therefore it is not possible to produce a stable frequency. In practice, the negative effect of the tolerance is compensated by individual adjustment of the flasher unit, however it is desirable to provide a circuit which no longer requires such adjustment.

SUMMARY OF THE INVENTION

It is an object of the invention therefore to provide a flasher unit which delivers a comparator output signal for control of the pulse generator, and therefore produces a stable frequency signal, for the whole of the light up time, regardless of tolerances of the reference and measured signal.

According to a first aspect of the invention, there is provided a flasher unit comprising reference means for supplying a reference voltage, a comparator having a first input connected to said reference means and a second input fed with a voltage depending on the current flowing through the lamps to be controlled by the flasher unit, a pulse generator fed by the comparator for producing a flash frequency signal for the lamps and a switch element for changing said reference voltage in accordance with the output of said comparator to cause said comparator to produce an output signal for the whole of the duration of the light up time of the lamps.

According to a second aspect of the invention, there is provided a flasher unit with a comparator, the output signal of which feeds a pulse generator in order to produce the flash frequency signal and a reference voltage is supplied to one input of said comparator and a voltage, which depends on the current passing through the flasher lamps, is supplied to the other input of the comparator in which a switch element is provided which changes the reference voltage in accordance with the output signal from the comparator so that a comparator output signal appears at the output of the comparator for the whole of the light up time.

BRIEF DESCRIPTION OF THE DRAWINGS

The invention will now be described in greater detail by way of example, with reference to the drawings, in which.

DESCRIPTION OF THE PREFERRED EMBODIMENTS

Figure 1:
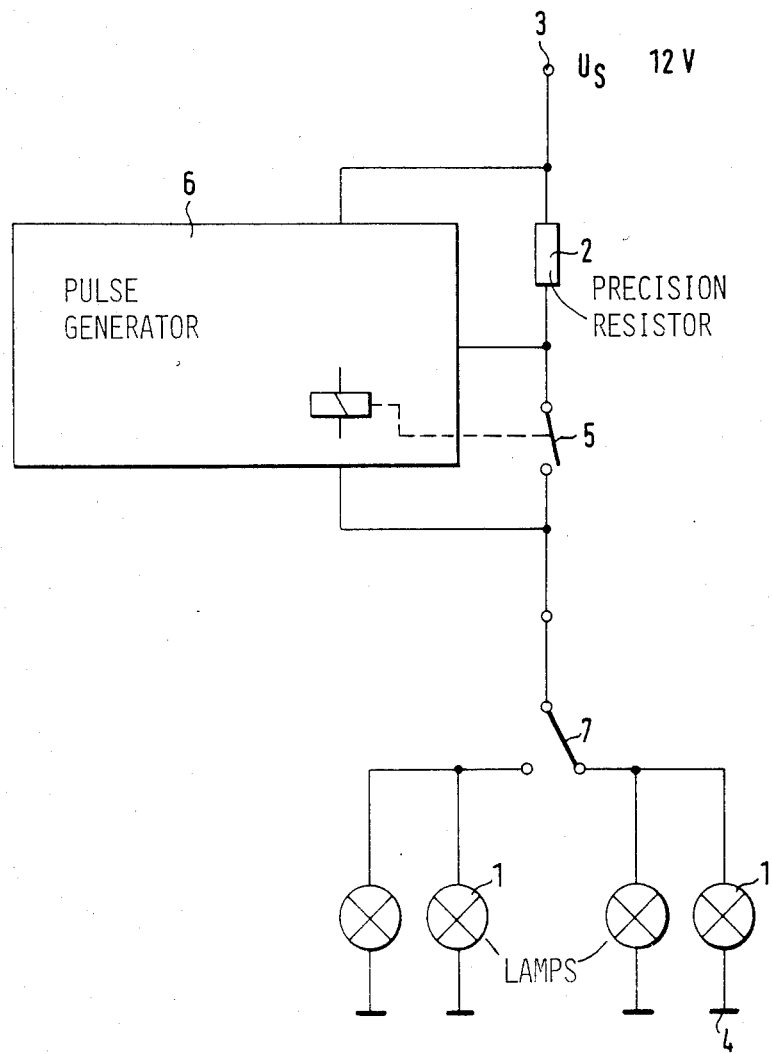
FIG. 1 is a block diagram of a circuit of a known flasher unit with a failure check.

In order to understand the situation with which the invention is to cope, a known form of flasher unit will first be described in connection with FIGS. 1 to 3.

As is known, a failure check has to be carried out for flasher units for use in motorised vehicles. FIG. 1 shows an example of how this can be carried out in principle. In the known unit, the flasher lamps 1 together with a precision resistor 2 are connected between the positive pole 3 and the negative pole 4 of a battery. The path comprising the precision resistor 2 and the flasher lamps 1 can be switched and in fact the switch 5 is switched by frequency switching in rhythm with the flash frequency by means of a pulse generator 6.

The voltage drop which takes place across the precision resistor 2, which is proportional to the current through the flash lamps 1 is evaluated and supplied to the pulse generator 6. The pulse generator 6 is switched in frequency by the voltage across precision resistor 2. In order to be able to detect whether all of the flasher lamps which have to light up on actuation of the flash switch 7 are flashing and therefore whether the flash unit is operating (correctly), there must be a clear jump in flash frequency. This means that when operating the flash unit flash lamps have to flash at a substantially lower frequency than is the case when a lamp fails or the flash unit fails.

Figure 2:
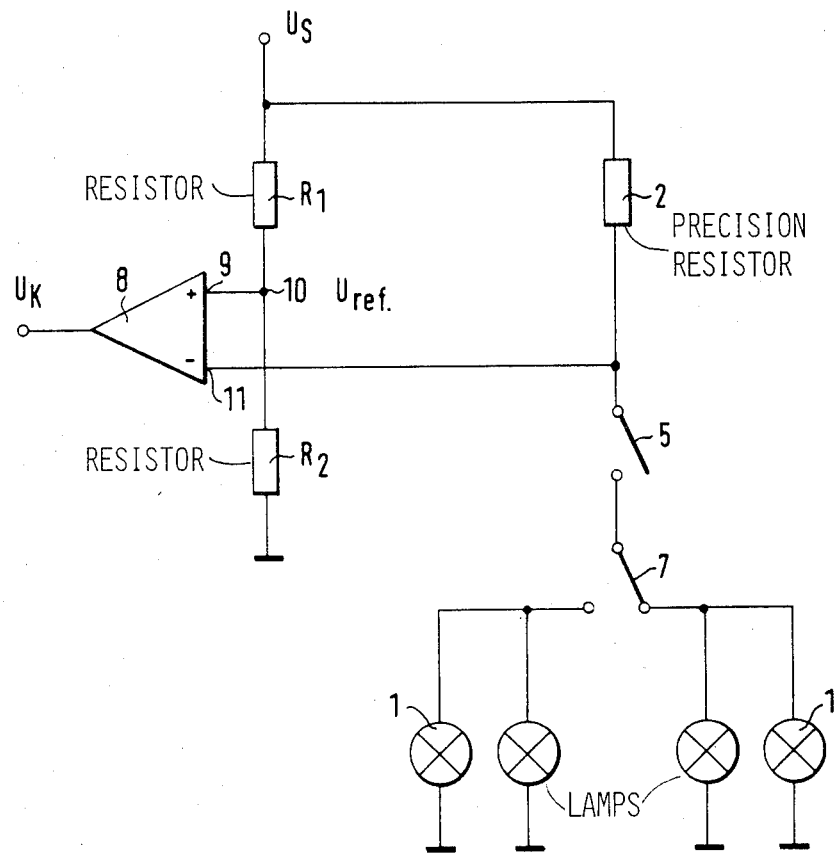
FIG. 2 is a circuit diagram of practical form of the known arrangement of FIG. 1.

FIG. 2 shows a practical example of a flash unit with fault indication. Besides the precision resistor 2, the relay contact 5, which can be switched in time with the flash frequency, and the flasher lamps 1, there is a voltage divider which comprises two resistors $R_1$ and $R_2$ and is connected in parallel with the voltage source. FIG. 2 also shows a comparator 8, a reference voltage $U_{ref}$ being supplied to one input 9. This reference voltage is tapped at the connecting point between resistors $R_1$ and $R_2$ of the voltage divider. The voltage across precision resistor 2 is supplied to the other input 11 of the comparator 8. The voltage across the precision resistor 2, which is proportional to the current through the flasher lamps 1 delivers the measured signal which is compared in the comparator 8 with the reference voltage. The comparator 8 delivers the comparator signal $U_K$.

FIG. 3 shows the signal path in the circuit of FIG. 2. As FIG. 3 shows, the path of the measured voltage $U_M$ (voltage drop across precision resistor 2) depends on the filament temperature of the flasher lamps. As is known, the current through an incandescent lamp is substantially greater at the moment when it is switched on, than is the case during ordinary running. Therefore the voltage drop across precision resistor 2 is also at its greatest at the moment of switching on, in accordance with FIGS. 3a and 3b (300 mV in FIG. 3a and 150 mV in FIG. 3b). After switching on (the lamp), the voltage across precision resistor 2 falls and in fact falls from 300 mV to 150 mV in FIG. 3a and from 150 mV to 80 mV in FIG. 3b. $U_{m1}$ is the voltage drop across precision resistor 2 at low frequency (FIG. 3a—flash unit OK-) whereas $U_{M2}$ is the voltage drop across precision resistor 2, when there was a fairly high (doubled) frequency (FIG. 3b—flash unit not OK-). When the relay contact 5 is open, i.e. when the lamp is not on, the voltage drop across precision resistor 2 returns to zero in accordance with FIGS. 3a and 3b.

Figure 3A:
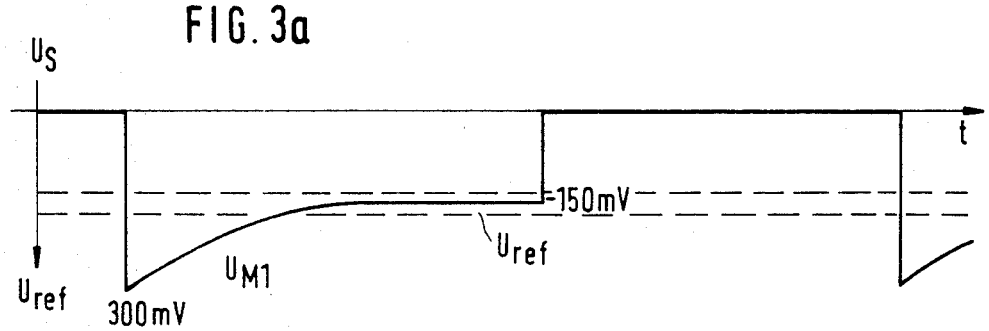
FIGS. 3a and 3b are graphs showing the signal path of the voltage drop across the precision resistor in the circuit of FIG. 2 with the circuit working correctly (3a) and with a failure in the circuit (3b)
Figure 3B:
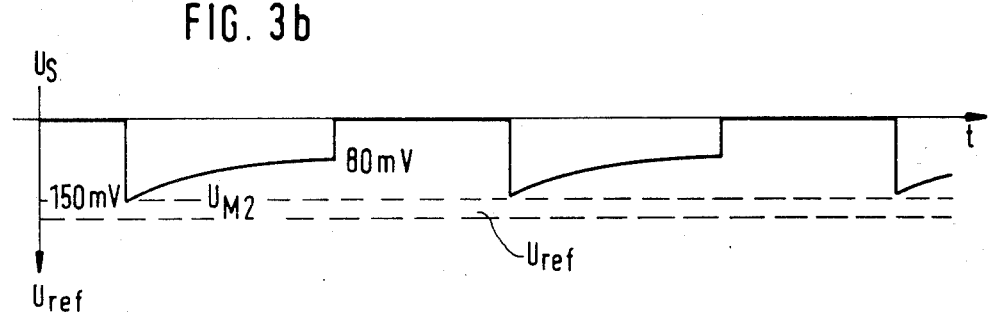
Figure 3C:
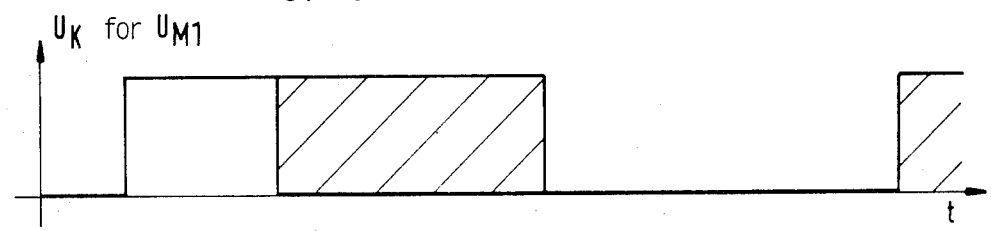
FIGS. 3c and 3d are graphs showing the comparator output signal for the conditions present in FIG. 3a and 3b respectively.
Figure 3D:
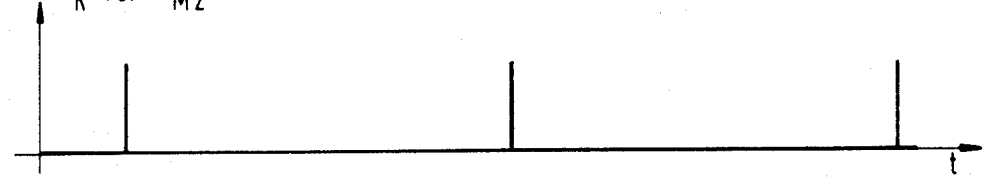

FIGS. 3a and 3b also show the path of the reference voltage $U_{ref}$ in addition to the path of the voltage $U_M$, the reference voltage being equal to the voltage drop across the resistor $R_1$. The reference voltage remains almost constant both during the light up time and when the lamp is not lit, however, it remains within a certain tolerance range. If, in the case of the circuit of FIG. 2, a fixed reference voltage $U_{ref}$ is used, then only very small tolerances are permitted for optimum operation of the pulse generator 6 which is fed by the output signal $U_K$ of the comparator 8. FIGS. 3c and 3d show the path of the comparator signal $U_K$ for an assumed tolerance range as shown. The tolerance range shown means that, depending on the circumstances, in this range, either a comparator signal $U_K$ is provided for control of the pulse generator or is not. However, perfect generation of the flash frequency presupposes that a comparator output signal $U_K$ has to be provided for the whole of the light up time (light up time equals the time in which the flasher lamps are illuminated). FIG. 3c shows the path of $U_K$ for the low frequency and FIG. 3d for the high frequency.

The invention is based on the kowledge that a tolerance range for the comparator output signal cannot be avoided with a fixed reference voltage and therefore it is not possible to produce a stable frequency. In practice, the negative effect of the tolerance is compensated by individual adjustment of the flasher unit, however it is desirable to provide a circuit which no longer requires such adjustment.

In a preferred embodiment of the invention, in a flasher unit of the type above described, a switch element is provided which changes the reference voltage in accordance with the comparator output signal so that a comparator output signal appears at the output of the comparator during the whole of the light up time.

This condition has to be fulfilled during normal flasher operation i.e. when the flash unit is not defective or when the flasher lamps, each of which has to flash, are intact and therefore are also flashing. The switch element is controlled by the output signal of the comparator and connects or disconnects a resistor to a voltage divider path serving to produce the reference voltage in accordance with the comparator output signal and changes the reference voltage which is to be supplied to one comparator input in accordance with the comparator output signal.

Figure 4:
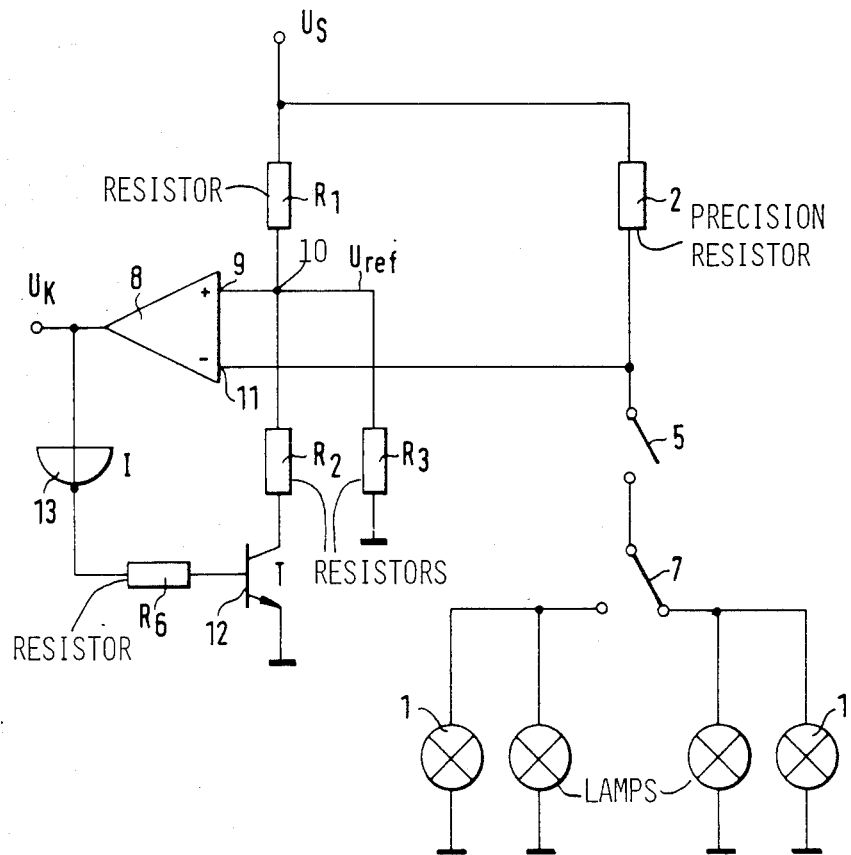
FIG. 4 is a circuit diagram of a flasher unit in accordance with the invention.
Figure 5A:
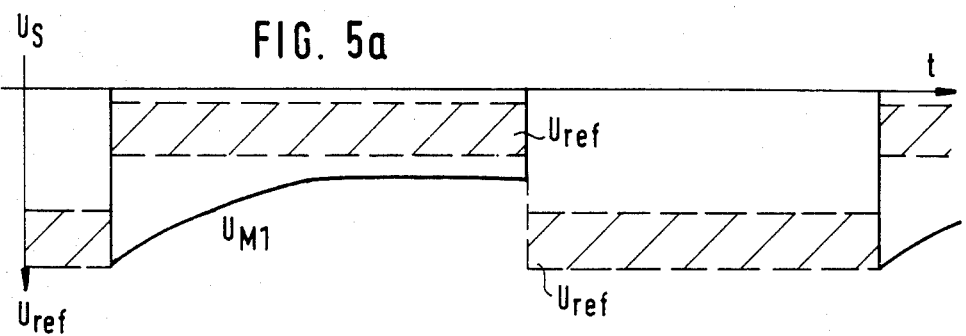
FIGS. 5a and 5b are graphs similar to FIGS. 3a and 3b but showing the situation for the circuit of FIG. 4.
Figure 5B:
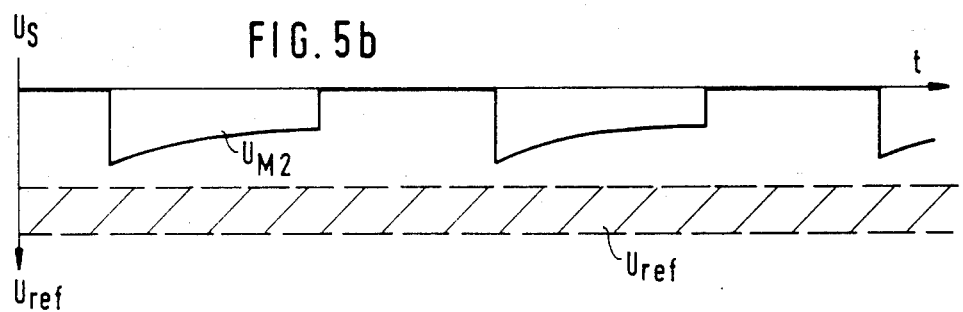
Figure 5C:
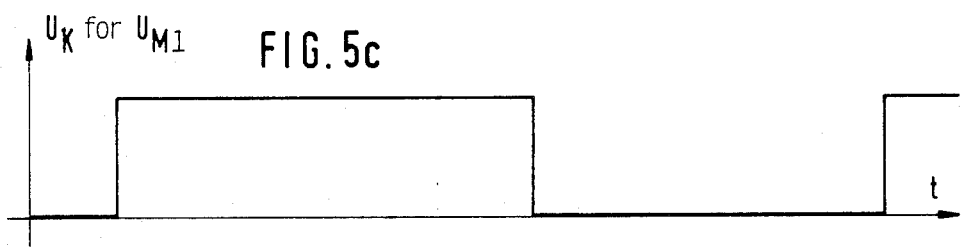
FIGS. 5c and 5d are graphs similar to FIGS. 3c and 3d but showing the situation for the circuit of FIG. 4.
Figure 5D:
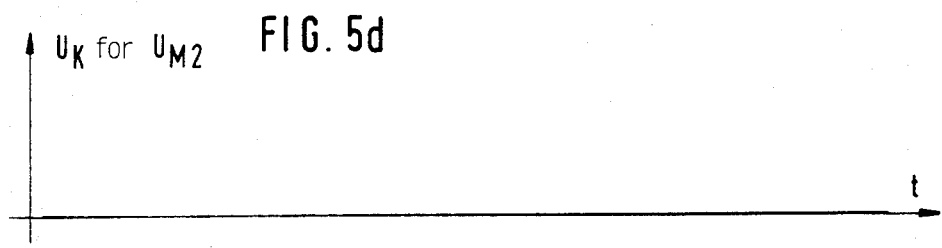

FIG. 4 shows a flasher unit with reference voltage switching in accordance with the invention. In the arrangement of FIG. 4 a voltage divider which has resistors $R_1$ and $R_2$ and serves to produce the reference voltage $U_{ref}$ is also present in the arrangement of FIG. 2. The reference voltage corresponding to the voltage drop across resistor $R_1$ is tapped at the connecting point 10 between resistors $R_1$ and $R_2$.

The emitter collector path of a switching transistor 12 is in series with the resistor $R_2$ and a resistor $R_3$ is arranged parallel with this series connection comprising resistor $R_2$ and switching transistor 12. In contrast to known circuits the reference voltage does not have a fixed value in the flasher unit in accordance with the invention but rather changes according to whether the current flows to earth only via $R_3$ or via the parallel connection of $R_2$ and $R_3$ depending on the blocking condition or open condition of the switching transistor 12. Resistors $R_1$, $R_2$ and $R_3$ should be selected so that the reference voltage is switched to a value smaller than the smallest measured signal when the switching transistor 12 is in its blocked condition, said smallest measured signal occurring during normal flash operation. The switching transistor 12 is controlled by the output signal $U_K$ of comparator 8 and in fact via the inverter 13 and resistor $R_6$.

As FIG. 5 shows the above arrangement makes the evaluated measured signal $U_K$ available during the whole of the light up time in the form of a pulse. As a result, it is possible to achieve a stable frequency with the aid of a pulse generator connected after the comparator when there is a substantially larger tolerance for the measured voltage or reference voltage, this stable frequency not having any repercussions with regard to the tolerances.

In the unmodulated condition which is provided during the unlit phase at low frequency and for the whole period at high frequency, the comparator output voltage is zero volts. In this condition, the inverted signal (after the inverter 13) assumes a voltage which controls the transistor 12. In the saturated condition of transistor 12, the resistor $R_2$ is connected in parallel with the resistor $R_3$ and the reference signal $U_{ref}$ is determined by the divider ratio between $R_1$ and $R_2$ parallel to $R_3$. In the modulated condition (light up time, low frequency) the transistor 12 is blocked. In this blocked condition, the reference voltage $U_{ref}$ is determined by the divider ratio of $R_1$ and $R_2$ and is therefore more positive than in the dark phase.

The batteries in the motor vehicles have a voltage range which is generally between 10 and 15 V. This means a change in the resistance of flash lamps by approximately 20%. Since the resistance of the lamps is greater as the voltage rises, the change in the measured signal produced at the precision resistor is smaller than the change in the supply voltage. Therefore a certain change in the measured signal cannot be avoided without special means.

Figure 6:
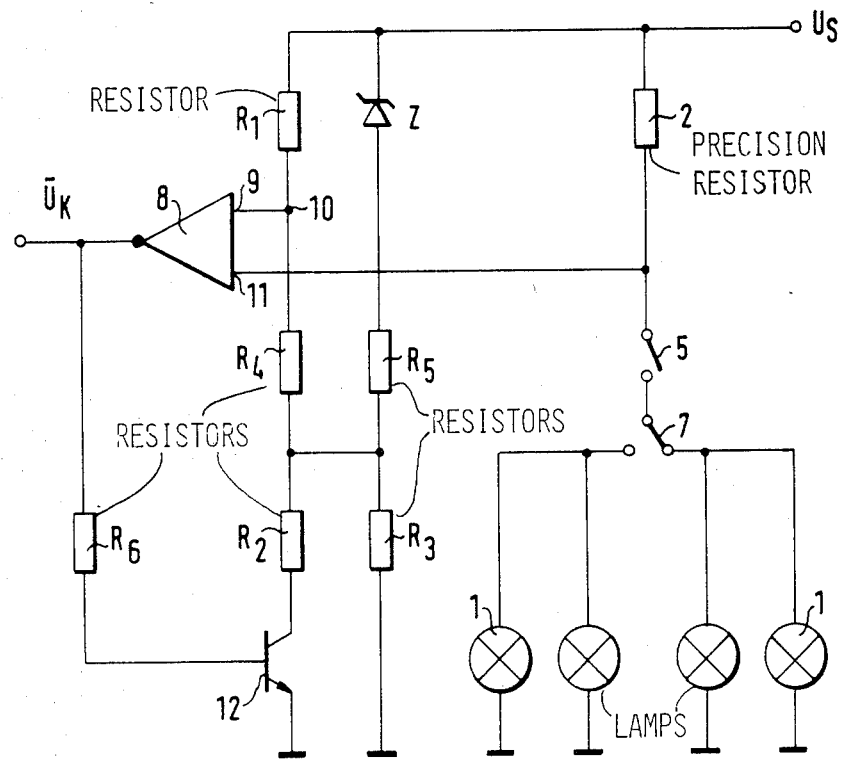
FIG. 6 is a circuit diagram of the flasher unit of FIG. 4 modified to reduce the effect of undesirable changes in battery voltage.

In order to keep the measured signal constant as far as possible when there is an undesirable change in the battery voltage, in accordance with a modification of the invention, such as shown in FIG. 6, a fourth resistor $R_4$ and a fifth resistor $R_5$ are provided in addition to the first resistor $R_1$, the second resistor $R_2$ and the third resistor $R_3$. In this case the fourth resistor $R_4$, which lies between the first resistor $R_1$ and the second resistor $R_2$, together with resistors $R_1$, $R_2$ and $R_3$ form the voltage divider. The reference voltage $U_{ref}$ is tapped in this case at the connecting point 10 between the first resistor $R_1$ and the fourth resistor $R_4$. The series connection of the fifth resistor $R_5$ with a zener diode Z is parallel to the resistors $R_1$ and $R_4$. The resistor $R_1$, $R_2$, $R_3$, $R_4$ are selected so that any change in the battery voltage has as little effect as possible on the measured signal across precision resistor 2.

It will be understood that the above description of the present invention is susceptible to various modification changes and adaptations.

What is claimed is:

1. A flasher unit with flasher lamps connected to receive a current to illuminate said lamps, a comparator, a pulse generator connected to receive the output signal from said comparator in order to produce the flash frequency signal, means supplying a reference voltage to one input of said comparator means supplying a voltage, which depends on the current passing through the flasher lamps, to the other input of the comparator, said comparator having an output which produces an output signal representative of the difference between the voltage at said comparator inputs, and a switch element connected for changing the reference voltage in accordance with the output signal from the comparator, said switch element being connected between said one input and said output of said comparator, so that a comparator output signal appears at the output of the comparator for the entire light up time of said lamps.

2. A flasher unit as defined in claim 1 and comprises a switching transistor forming said switch element.

3. A flasher unit as defined in claim 2 wherein said reference means comprises a voltage divider with first and second resistors with said reference voltage being produced at said first resistor.

4. A flasher unit as defined in claim 3, wherein said switch element has a closable conductive path connected in a series circuit with said second resistor of said voltage divider and a third resistor connected in parallel with said series circuit so that when the switch element is open the parallel connection comprising said second and said third resistors is in series with said first resistor and when the switch element is blocked only said third resistor is kept in series with the said first resistor.

5. A flasher unit as defined in claim 4 wherein said closable conductive path of said switching transistor is its emitter collector path.

6. A flasher unit as defined in claim 5 wherein the base of said switching transistor is controlled by the output signal of said comparator.

7. A flasher unit as defined in claim 2 and comprising an inverter between the base of said switching transistor and the output of said comparator.

8. A flasher unit as defined in claim 4 and comprising an emitter for said switching transistor connected to said reference voltage and a positive pole of a voltage source connected to the other end of a series connection comprising said switching transistor and said voltage divider.

9. A flasher unit as defined in claim 4 wherein said first, said second and said third resistors are selected such that said reference voltage is switched over to a value which is smaller than the smallest measured signal occurring during normal flashing operation.

10. A flasher unit as defined in claim 4 and comprising a fourth resistor in series with said first resistor; with said reference voltage tapped at the connection point between said first and said fourth resistors; and a series connection comprising a fifth resistor and a zener diode in parallel with said first and said fourth resistors.

11. A flasher unit as defined in claim 10 wherein said means supplying a voltage to the other input of the comparator comprises a precision resistor connected to the flasher lamps so that the voltage drop across said precision resistor is proportional to the current through the flasher lamps and determines the voltage supplied to the other input of the comparator, said resistors of said voltage divider, said fourth resistor and said zener diode are selected such that at a change in the voltage of a battery of a vehicle to which said flasher unit is connected, a change in the voltage drop across the precision resistor is minimized.

12. A flasher unit comprising flasher lamps connected to receive a current to illuminate said lamps, reference means for supplying a reference voltage, a comparator having a first input connected to said reference means, a second input fed with a voltage depending on the current flowing through the lamps to be controlled by the flasher unit, and an output which produces an output signal representative of the difference between the voltages at said first and second inputs, a pulse generator fed by the comparator for producing a flash frequency signal for the lamps and a switch element connected to said comparator for changing said reference voltage in accordance with the output signal of said comparator to cause said comparator to produce an output signal for the entire duration of the light up time of the lamps.

* * * * *